April 24, 1928.  
O. H. HANSEN  
CORN SILKER  
Filed June 14, 1926
1,666,933
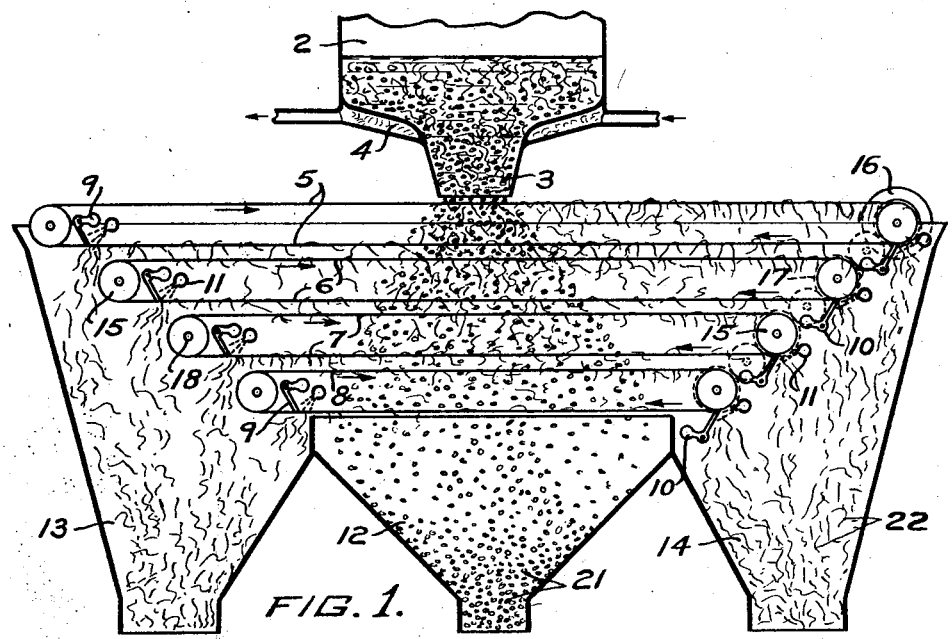
FIG. 1.
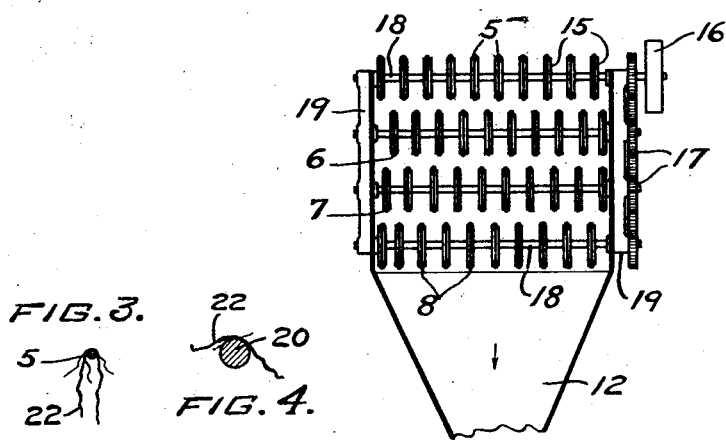
FIG. 3.  
FIG. 4.  
FIG. 2.
INVENTOR-  
O. H. Hansen  
BY  
W. H. Lieber  
ATTORNEY.

Patented Apr. 24, 1928.

1,666,933

UNITED STATES PATENT OFFICE.

OSWALD H. HANSEN, OF MILWAUKEE, WISCONSIN, ASSIGNOR TO HANSEN CANNING MACHINERY CORPORATION, OF CEDARBURG, WISCONSIN, A CORPORATION OF WISCONSIN.

CORN SILKER.

Application filed June 14, 1926. Serial No. 115,774.

This invention relates in general to improvements in the art of separating fibrous from non-fibrous particles, and relates more specifically to an improved method of and apparatus for removing silk from corn.

An object of the invention is to provide an improved process of silking corn or other material having similar characteristics. Another object of the invention is to provide simple and efficient apparatus for carrying on the commercial exploitation of the improved process.

While various attempts have heretofore been made to remove silk fibres from the kernels of corn after removal thereof from the cob and prior to packing, all of these prior efforts have proven commercially unsuccessful and extremely unsatisfactory, either because of the relative inefficiency thereof, or because of their unsanitary nature, or because of the high cost of construction and maintenance of the apparatus necessary for exploitation of the methods. The present invention contemplates provision of a highly sanitary, simple, and efficient method of removing all of the objectionable silk fibre from the corn kernels, automatically and with the aid of relatively simple and inexpensive machinery. In accordance with the improvement, the mixture of kernels and silk is precipitated over a longitudinally moving edge or line-like element to which the fibres adhere and from which the separated fibres are automatically removed by virtue of the continued movement of the element. The invention enables the use of separating wires of relatively small diameter, whereby even the extremely short pieces of silk are effectively removed, a result which cannot be obtained with the prior methods and apparatus.

A clear conception of the several steps of the improved process and of the construction and operation of one form of apparatus adapted to commercially exploit the same, may be had by referring to the drawing accompanying and forming a part of this specification in which like reference characters designate the same or similar parts in the several views.

Fig. 1 is a somewhat diagrammatic vertical longitudinal section through an improved corn silker.

Fig. 2 is a diagrammatic vertical transverse section through the improved corn silker.

Fig. 3 is a full size transverse section through one of the separating elements or wires utilized in the improved corn silker.

Fig. 4 is a full size transverse section through one of the separating wires utilized in the prior corn silkers wherein wires were employed to remove the silk fibres from the corn kernels.

The improved corn silker diagrammatically illustrated herein, comprises in general a supply hopper 2 having one or more discharge nozzles 3 formed to precipitate a mixture of silk fibres and corn kernels downwardly; a corn kernel receiving receptacle 12 disposed some distance below the hopper 2; a pair of silk fibre receiving receptacles 13, 14 disposed one at each end of the corn receptacle 12; and a plurality of superimposed longitudinally movable elongated elements or wires 5, 6, 7, 8 movable through the space between the supply hopper 2 and the receiving receptacle 12. The supply hopper 2 may be provided with a heater 4 for heating the contents of the hopper in an obvious manner. The kernel receiving receptacle 12 is disposed directly below the discharge nozzles 3, so as to receive the corn kernels precipitated by gravity from these nozzles.

The superimposed longitudinally movable elongated elements are specifically disclosed as being endless wires 5, 6, 7, 8 of relatively small diameter, as compared to the relatively inefficient separating wires 20 previously employed in corn silkers and illustrated in Fig. 4. Each of the endless separating wires is movably retained upon a pair of horizontally spaced sheaves 15 disposed above the silk receptacles 13, 14, the sheaves 15 being rotatably supported by horizontal shafts 18 mounted in bearings in the side frames 19. The longitudinally movable stretches of the wires 5, 6, 7, 8 are preferably disposed in different vertical planes thus presenting only limited spaces between the respective wires when viewed from above or in the direction of precipitation of the material. The wires 5, 6, 7, 8 are simultaneously movable in the directions indicated by the arrows in Fig. 1, and at approximately the same speed, by means of a pulley 16 and intermeshing spur gears 17 associated with the shafts 18 at one end of the silker, and a scraper 9, 10 coacts with the upper and lower stretch of each wire at opposite ends of the device above the silk receptacles 13, 14. A spray nozzle 11 for washing the fine silk fibres from the wires, may also be provided adjacent to each scraper 9, 10 thus substantially completing the structure.

During normal operation of the silker to exploit the improved process, the elongated elements or wires 5, 6, 7, 8 are moved continuously in the directions indicated by the arrows, by means of power applied to the pulley 16. When viewed from above, these wires while in motion present the appearance of longitudinally moving parallel edges or straight lines. The supply hopper 2 is then provided with a mixture of corn kernels 21 and silk fibres 22 which may be mixed with liquid and heated within the hopper 2 in order to soften the fibres. After being properly conditioned within the hopper 2, the mixture of kernels and fibre is precipitated by gravity from the nozzles 3 and over the moving wires located therebelow. The corn kernels 21 because of their shape, tumble past the moving wires 5, 6, 7, 8 and drop directly into the receptacle 12, but the silk fibres 22 straddle and cling to the relatively thin moving wires and are thus transported to the opposite ends of the machine above the receptacles 13, 14. The adhering silk fibres 22 are continuously removed from the advancing wires by the scrapers 9, 10 which deposit the removed fibres into the silk receptacles 13, 14. The sprays delivered against the wires after removal of the bulk of the fibres 22 by the scrapers 9, 10, effectively remove the small particles of fibre and finally clean and condition the wires for further service. It will thus be noted that the silk fibres 22 are continuously and automatically separated from the corn kernels 21 while the separating mechanism is constantly maintained in sanitary operating condition.

By heating the silk fibres 22 prior to separation, these fibres will be softened to such an extent that they will more readily cling to the separating wires. The use of continuous endless elements or wires 5, 6, 7, 8, enables utilization of relatively thin bands or wires such as piano wire, thereby enabling the relatively short fibres 22 to more readily straddle the separating elements and insuring more effective separation. The wires 5, 6, 7, 8 need not necessarily be disposed parallel to each other, nor is it essential to utilize more than one wire, so long as portions of the wire or wires move longitudinally across the path of precipitation of the mixture. It is moreover not essential to utilize actual wires in order to provide longitudinally movable line like elements. The entire structure is obviously extremely simple in construction and may be operated to produce effective separation of the materials at extremely moderate cost.

It should be understood that it is not desired to limit the invention to the exact steps of the process or to the precise details of construction and operation of the apparatus herein described and illustrated, for various modifications within the scope of the claims may occur to persons skilled in the art.

It is claimed and desired to secure by Letters Patent:—

1. In combination, a series of superposed wires of different lengths, each of said wires being shorter than the wire thereabove, means for longitudinally moving said wires, means for dropping a mixture of kernels and silk upon said wires, and means for removing the silk from an end portion of each of said wires vertically beyond the end portion of the wire thereunder.

2. In combination, a series of superposed endless wires having substantially horizontal stretches of different lengths, the stretches of the lower wires being shorter than those of the wires thereabove, means for longitudinally moving the stretches of said wires, means for dropping a mixture of kernels and silk upon said stretches, and means for removing the silk from an end portion of the stretches of each of said wires vertically beyond the end portion of the stretches of the wire thereunder.

3. In combination, a series of superposed endless wires of different lengths disposed in different vertical planes, each of said wires having oppositely movable stretches and being longer than the wire directly therebelow, means for longitudinally moving said stretches, means for dropping a mixture of kernels and silk upon said stretches while in motion, and means for removing the silk from an end portion of each stretch of each of said wires vertically beyond the end portion of the wire directly thereunder.

4. In combination, a series of superposed endless wires having substantially horizontal stretches of different lengths and being disposed in different vertical planes, the stretches of each of said wires being longer than those of the wire directly therebelow, means for longitudinally moving the stretches of each of said wires in opposite directions, means for dropping a mixture of kernels and silk upon said stretches while in motion, and means for removing the silk from opposite end portions of the stretches of each of said wires vertically beyond the end portions of the stretches of the wires directly thereunder.

5. In combination, a series of superposed single strand metal endless wires having parallel stretches disposed in substantially parallel vertical planes, means for longitudinally moving the stretches of said wires, means for dropping a mixture of kernels and silk upon said stretches while in motion, and a scraper for removing the silk from each of said stretches vertically beyond the wires therebelow.

In testimony whereof, the signature of the inventor is affixed hereto.

OSWALD H. HANSEN.